(12) United States Patent
Cerovcevic et al.

(10) Patent No.: US 12,342,010 B2
(45) Date of Patent: Jun. 24, 2025

(54) HYBRID RADIO-TELEVISION CHANNEL

(71) Applicant: e Scapes Network LLC, Monroe, MI (US)

(72) Inventors: Dragan Cerovcevic, Kettering, OH (US); Roy Radakovich, Trenton, MI (US); Eli Oklejas, Newport, MI (US); Robert A. Oklejas, Newport, MI (US)

(73) Assignee: e Scapes Network LLC, Monroe, MI (US)

( * ) Notice: Subject to any disclaimer, the term of this patent is extended or adjusted under 35 U.S.C. 154(b) by 0 days.

(21) Appl. No.: 18/642,940

(22) Filed: Apr. 23, 2024

(65) Prior Publication Data

US 2024/0364945 A1    Oct. 31, 2024

Related U.S. Application Data

(60) Provisional application No. 63/518,677, filed on Aug. 10, 2023, provisional application No. 63/462,759, filed on Apr. 28, 2023.

(51) Int. Cl.
  *H04N 21/234*   (2011.01)
  *H04N 21/2665*  (2011.01)
  *H04N 21/81*    (2011.01)
  *H04N 21/845*   (2011.01)

(52) U.S. Cl.
  CPC ... *H04N 21/23424* (2013.01); *H04N 21/2665* (2013.01); *H04N 21/812* (2013.01); *H04N 21/8455* (2013.01)

(58) Field of Classification Search
  CPC ......... H04N 21/23424; H04N 21/2665; H04N 21/812; H04N 21/8455
  See application file for complete search history.

(56) References Cited

U.S. PATENT DOCUMENTS

| | | | |
|---|---|---|---|
| 8,151,315 B2 | 4/2012 | Oklejas | |
| 8,978,087 B2 | 3/2015 | Oklejas | |
| 9,420,321 B2 | 8/2016 | Oklejas | |
| 10,219,035 B2 | 2/2019 | Oklejas | |
| 2012/0051543 A1* | 3/2012 | Evans | ....................... H04L 9/08 |

FOREIGN PATENT DOCUMENTS

CA          2774487 A1      3/2011

* cited by examiner

*Primary Examiner* — Anthony Bantamoi
(74) *Attorney, Agent, or Firm* — Howard & Howard Attorneys PLLC

(57) ABSTRACT

A method for providing programmatic commercial insertion for a hybrid radio-TV channel of a system includes providing integrated or combined radio content from a radio system for broadcasting on the hybrid radio-TV channel, providing television content from a television system for display on the hybrid radio-TV channel during the content blocks; determining whether a video content is available from the radio system or from ad server during the ad insertion point; and determining whether a pre-loaded logo is available from the radio system during the ad insertion points. The method further includes inserting the video content from the radio system into the hybrid radio-TV channel for display if available, otherwise inserting the video content from the ad server, otherwise inserting the pre-loaded logo from the radio system, or otherwise displaying the video content from the television system and/or from the hybrid radio-TV channel. An associated system is also provided.

20 Claims, 2 Drawing Sheets

HYBRID RADIO-TELEVISION CHANNEL

CROSS-REFERENCE TO RELATED APPLICATIONS

The present application claims priority to and all the benefits of U.S. Provisional Patent Application No. 63/518,677, filed on Aug. 10, 2023 and U.S. Provisional Patent Application No. 63/462,759, filed on Apr. 28, 2023, the entire contents of which are expressly incorporated herein by reference.

FIELD OF THE DISCLOSURE

The subject disclosure relates a method of providing programmatic commercial insertion for a hybrid radio-TV channel and an associated system configured to provide programmatic commercial insertion for a hybrid radio-TV channel.

BACKGROUND

Generally, with media distribution systems (e.g., radio stations, cable TV, and the like), programming is generated in the hopes of entertaining and attracting an audience or users (listeners or viewers). With the current trend of users shifting their media consumption from traditional television to streaming services, including video-on-demand and live streaming, advertisers are seeking new ways to reach their audience. In addition, radio stations as well are faced with declining advertisement revenues due to increased competition from other media channels.

Existing models related to advertisement and media distribution systems have numerous limitations that results in a less than an ideal experience. A limitation is of a broadcast is that there is no link between the broadcast stream and certain advertisement playing. A user may be less engaged with or tune out an advertisement if the user only hears the advertisement which results in decreased user engagement and effective advertisement. It is therefore desirable to provide advertisement in a way that links the audio content from the advertisement to video content. In this way, the user is more engaged with the advertisement. Another limitation is music licensing fees associated with media distribution systems. When a song is played in a program, the media distribution system typically pay a music licensing fee. Costs for popular songs can be quite expensive for television programs. It is therefore desirable to provide audio content at lower costs.

Another limitation is that existing models fail to provide a mechanism for terminal-based determination of advertising slots in the program as well as they fail to offer a truly automated selection of advertising material for insertion into these advertising slots. It is desirable to provide such a mechanism for a channel in which advertisement insertion can occur. In this way, the advertisement may be programmatically inserted with video content, reducing manual intervention while streamlining the advertisement process. It is also desirable to provide a mechanism to increase advertisement revenue with such programming.

Accordingly, there remains a need in the art to address one or more of the challenges outlined above.

SUMMARY OF THE DISCLOSURE

The subject disclosure provides a method for providing programmatic commercial insertion for a hybrid radio-TV channel of a system that includes providing integrated or combined radio content from a radio system for broadcasting on the hybrid radio-TV channel, providing television content from a television system for display on the hybrid radio-TV channel during the content blocks; determining whether video content is available from the radio system or from ad server during the ad insertion point; and determining whether a pre-loaded logo is available from the radio system during the ad insertion points. The method further includes inserting the video content from the radio system into the hybrid radio-TV channel for display if available, otherwise inserting the video content from the ad server, otherwise inserting the pre-loaded logo from the radio system, or otherwise displaying video content from the television system and/or from the hybrid radio-TV channel.

An associated system configured for providing programmatic commercial insertion for a hybrid radio-TV channel is also provided.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
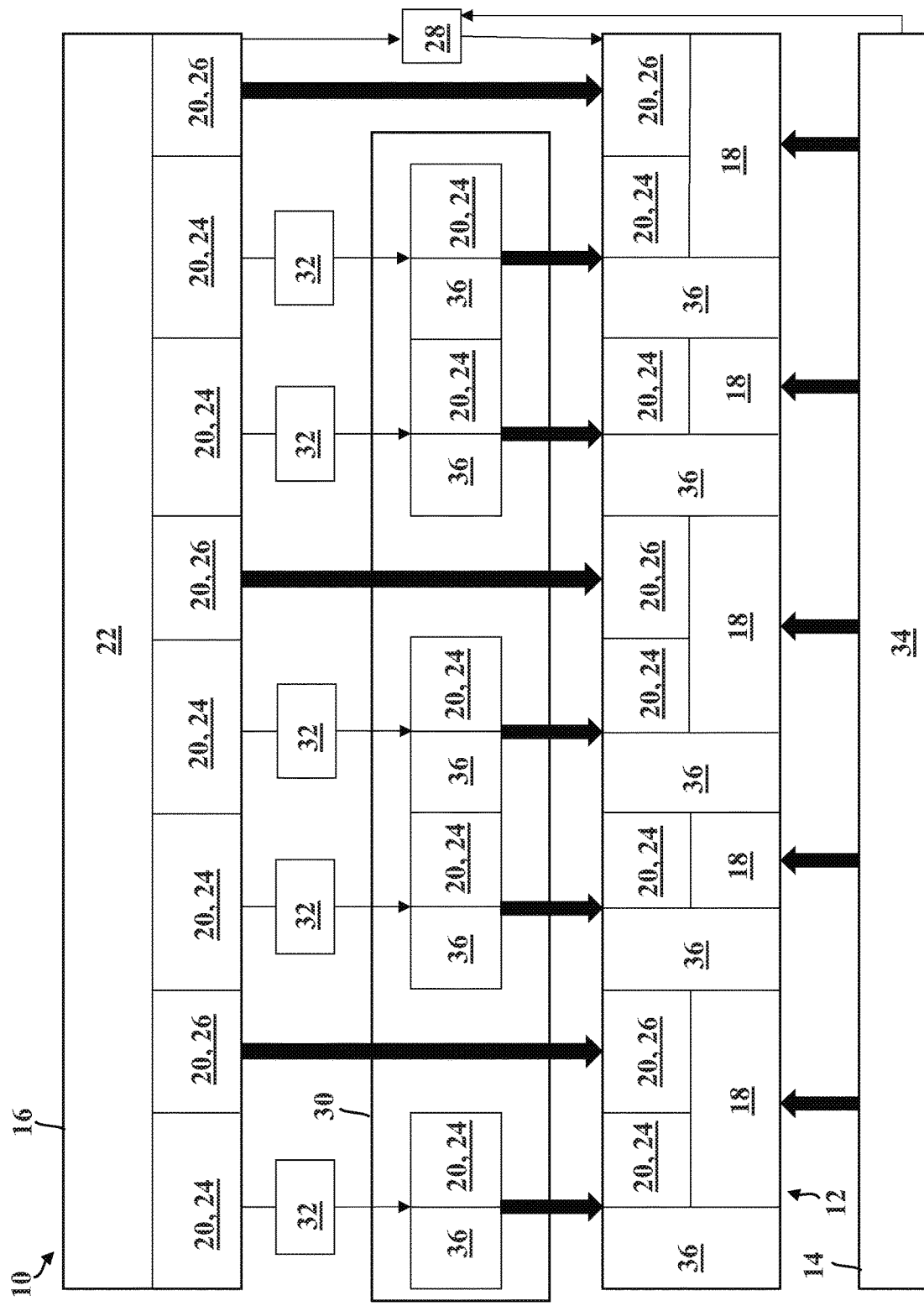
FIG. 1 illustrates a system showing a hybrid radio-TV channel connected to a television system and a radio system.

Referring to FIG. 1, exemplary details of a system 10 with non-synchronized content programming is shown. The system 10 includes a hybrid channel 12 providing content to a viewer associated with the hybrid channel 12, a television system 14, and a radio system 16. Content programming as used herein refers to visual, audio, or audio-visual content inserted at predetermined insertion points in a linear flow of a broadcast or stream programming being delivered to the hybrid channel 12. A hybrid channel as used herein refers to a channel or terminal that supports transport streams from more than one broadcast, multicast, broadband, or stream by way of television, radio, or the like. Transport streams may include certain content and/or messages to provide signals or instructions to downstream components. Content programming, the television system 14, and radio system 16 will be discussed in greater details below.

The hybrid channel 12 shown in FIG. 1 is a hybrid radio-TV (HRTV) channel 12. It will be understood that the hybrid channel 12 could be any other channel used to provide content to the viewer associated with the hybrid channel 12. In some configurations, the HRTV channel 12 may be an internet protocol television (IPTV) terminal or a hybrid channel functioning as an IPTV terminal. For ease of description, the term "hybrid radio-TV (HRTV) channel 12" or "hybrid channel 12" or "HRTV channel 12" specifically incorporates and describes an internet protocol television (IPTV) terminal or a hybrid channel functioning as an IPTV terminal and are used hereinafter interchangeably.

The HRTV channel 12 supports television content 18 through its connection to the television system 14 (e.g., an over-the-air TV broadcast, a cable TV network, a satellite TV network, or any other system or network providing television content) as well as radio content 20 through its connection to the radio system 16.

More specifically, the HRTV channel 12 provides integrated or combined radio content 20 (broadcast or stream) from the radio system 16 with television content 18 (broadcast or stream) from the television system 14. Here, the radio and television contents are not synchronized. For example, the radio content 20 may be a song being broadcasted over a radio station and the television content 18 may be a visual imagery of landscape transmitted by the television system 14 and displayed on the. In this way, the HRTV channel 12 has the capability to combine visual imagery that is esthetically pleasing (such as beautiful architecture, cityscapes, harborscapes, landscapes, seascapes and the like), or topically interesting (visuals of the On Air Radio Personality) yet purposefully calming to the human psyche (no drama, comedy, adventure, or any other forms that are designed to engage or rivet the viewer's attention), with voice and music (with similarity to music therapy) that are also designed for calmness and distraction relaxation. The radio content 20 of the HRTV channel 12 is much like radio in that it can stand on its own as an entertainment format. Likewise, the television content 18 stands on its own, yet is connected to the radio content 20 to create a sense of beauty and tranquility and heighten interest as compared to either medium standing alone. It can alternatively described as more than radio, but less than conventional "frantic" television. This relationship between the television content 18 and radio content 20 is non-synchronized and creates a hybrid radio-TV channel.

Still referring to FIG. 1, a radio system 16 is provided. The radio system 16 provides or otherwise creates content of a radio program from a radio station or radio content 20, wherein the content may be, but not limited to, advertising, program, or program service or product content or combinations thereof. In particular, the radio system 16 provides or otherwise creates content programming via a radio automation system 22. More specifically, the radio automation system 22 provides or otherwise creates content blocks (e.g., music, news, weather, etc.) and commercial breaks with a cue tone, relay contact closures, or other signals indicating the start and length of the commercial break. The radio automation system 22 also provides or otherwise creates metadata relating to the radio station and separates radio content 20 from the radio station into distinct content blocks. In some configurations, a content block may be a radio advertisement block 24, representing advertisement (local or national) content. In some configurations, a content block may be a radio entertainment block 26, representing songs and other radio content of a radio program. In the configuration shown which is but one example, the radio automation system 22 separates content from the radio station into eight content blocks with five radio advertisement blocks 24 and three radio entertainment blocks 26.

The system 10 further includes an encoder 28 and an ad server 30. In some configurations, the system 10 includes a plurality of encoders 28. The encoder 28 is configured to encode or transcode each content block(s) based on a determined encoding parameter to generate an encoded media file in a target format. As mentioned above, the audio content and video content are non-synchronized. The encoder 28 is configured to receive and encode separate audio and video feeds. More specifically, the encoder 28 is configured to receive audio feeds from the radio system 16 and video feeds from the television system 14. During the reception of the stream of audio and video feeds (collectively "the streams"), the encoder 28 may be configured to continuously inspect the stream to find commercial break in time and commercial break out time (i.e., the time that the commercial break starts and the time that the commercial break ends). This data is required to provide commercials or advertisements with targeted video advertisements. The inspection is done in different ways depending on the advertisement break notification capabilities of the HRTV channel 12. Here, the HRTV channel 12 utilizes advertisement break notification capabilities (e.g., timing instructions, clock programming, and the like) of the radio system 16 such as a cue tone, relay contact closures, or other signals indicating the start and length of a commercial break associated with the radio station. In this way, the system 10 reduces the need for manual intervention and streamlines the advertising process all while providing viewers with an enhanced experience. The ad server 30 will be discussed in greater detail below.

An application programming interface (API) 32 may support communication between the radio system 16 and the ad server 30. Generally, APIs include a set of defined approaches for communication between software components, such as a protocol. The API 32 is presented at a separation of concern between software components, to make management of the distinct software component tractable, particularly for large bodies of code or code that is intended to be extensible by a diverse set of third parties. APIs 32 may define sets of approaches by which functionality of, for example, libraries, frameworks, operating systems, remote services, and web services are invoked by API consumers with API requests, such as API commands. Here, using the advertisement break notification capabilities associated with the radio system 16, the API 32 aids in providing programming insertion of advertisement.

The HRTV channel 12 includes programmatic insertion of commercials or advertisements. Commercials or advertisements may be inserted at predetermined ad insertion points (i.e., programmatic commercial insertion points), as programmed by radio stations, in a linear flow of a broadcast or stream programming being delivered to the hybrid channel. As a result, the HRTV channel 12 may be monetized through content programming. Content programming will be discussed in greater detail below.

The encoder 28 and the API 32 may be in communication such that content may be embedded from the radio system 16 automatically via the API 32. In some configurations, the encoder 28 converts a commercial break signal from the audio feed from the radio system 16 into an SCTE-35 signal, which then the ad server 30 processes to programmatically insert commercials at the designated point and duration. In some configurations, programmatic insertion of advertisement is performed using Society of Cable Telecommunications Engineer (SCTE) standards such as, for example, the SCTE-35 standard. The SCTE-35 signal or message indicates that a commercial, advertisement, or other message (e.g., public service announcement) is upcoming within the transport stream. The SCTE-35 signal or message may be driven by signal(s) from the radio automation system 22. In such configurations, the system 10 including the radio system 16, ad server 30, and encoder 28 provides or otherwise creates such signal(s) to programmatically insert commercials at designated points along the transport stream of the HRTV channel 12. The HRTV channel 12 is in communication with the ad server 30 to enable the ad server 30 and/or API 32 to manage placement of advertisements in the manner described above. For example, the HRTV channel 12 may be in communication with the ad server 30 to request for an ad list, and the API 32 may enable the HRTV channel 12 to insert ads in the ad slots.

It will be appreciated that the terms "commercial," "advertisement," "ad," and other terms of similar import may be used interchangeably herein to essentially refer to a commercial solicitation designed to sell a commodity or service or to inform an audience.

Still referring to FIG. 1, a television system 14 is provided. The television system 14 includes a broadcast automation system 34 configured to provide content of a television program from a television network or the like to the HRTV channel 12. In some configurations, the broadcast automation system 34 provides or otherwise creates content of a television program from any other type of network. For example, the television system 14 and/or the broadcast automation system 34 may support delivery of content from online interactive media, Internet TV, Over-the-Top (OTT) content, as well as on-demand streaming media through its connection to a network. Other sources of content are contemplated.

The HRTV supports models where broadcasted live or linear content is provided through a digital broadcast connection supplemented with a digital connection to the Internet, local network, and/or any present or future equivalent. The digital connection may allow the HRTV channel 12 to access content that can be downloaded or streamed to the HRTV channel 12, as well as a signaling path to back-end servers (not shown) in a network to retrieve additional information to enhance the viewing experience for the viewer.

Figure 2:
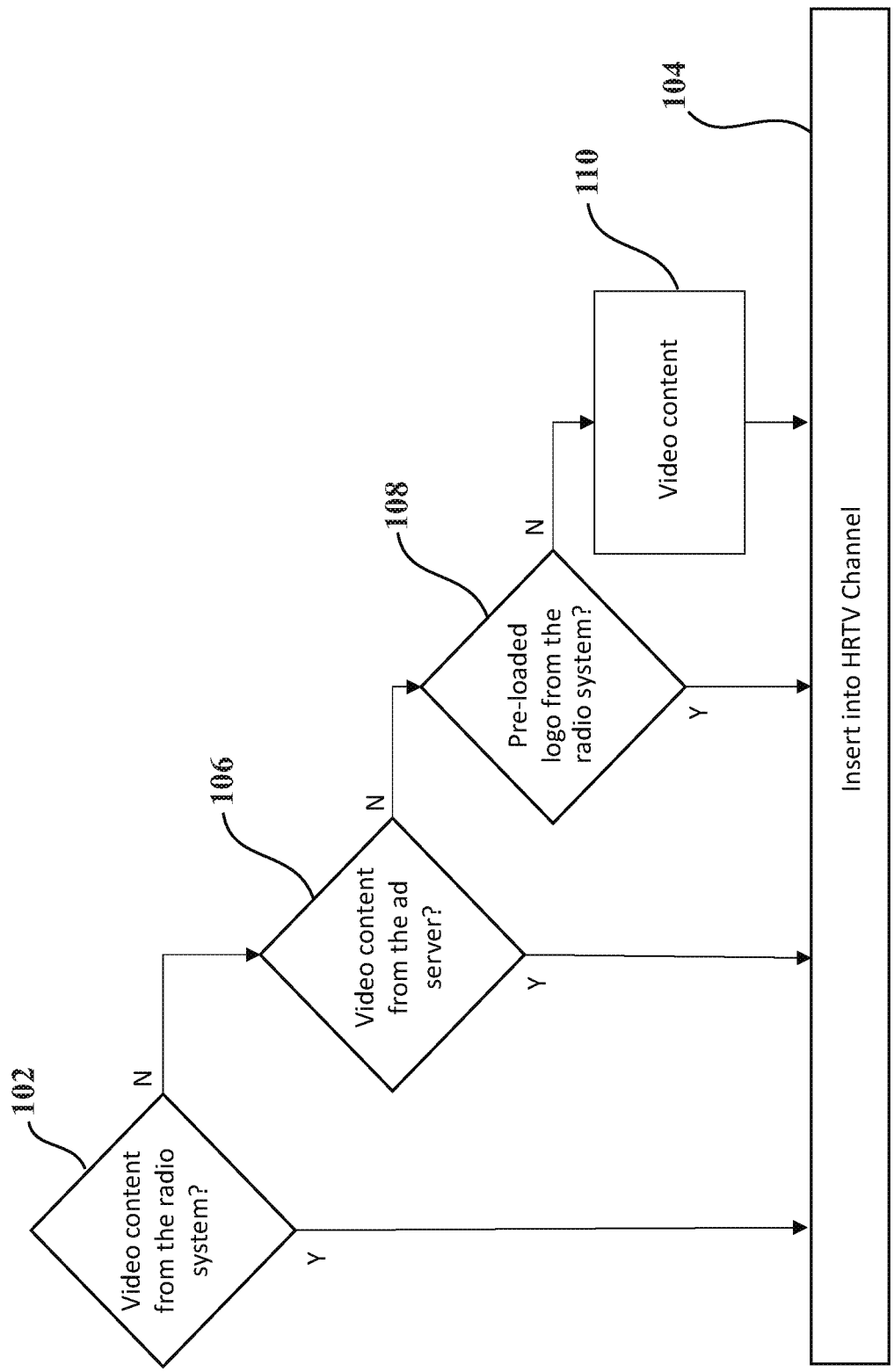
FIG. 2 is a flowchart of a method of providing the hybrid radio-TV channel with programmatic commercial insertion, according to one configuration of the system.

Referring now to FIG. 2, a method 100 of providing the HRTV channel 12 with programmatic commercial insertion is provided. As mentioned above, and as shown in FIG. 1, the HRTV channel 12 is provided with content programming where visual, audio, or audio-visual content is inserted at predetermined insertion points in a linear flow of a broadcast or stream programming being delivered to the HRTV channel 12. Combining the advertisement break notification capabilities (e.g., timing instructions, clock programming, and the like) and content from a radio station of the radio system 16 with a video content playout from a television system 14 and/or ad server 30 provides for a monetary mechanism for providing programmatic insertion of both audio-visual and audio-only commercials. In this way, the system 10 provides for more effective advertising and lower music licensing fees associated with broadcasting or streaming music.

The HRTV channel 12 is configured to receive advertising content from the ad server 30. In some configurations, the ad server 30 is in communication with at least one of the radio system 16, television system 14, and any third-party system providing advertising content to obtain any local/regional/national ad to be inserted into the programming of the HRTV channel 12. In some configurations, the ad server 30 may be a part of a broadcast or broadband network. While in other configurations, the ad server 30 may be a separately-managed server providing ad content to the HRTV channel 12, but not being a part of the HRTV channel 12. Other configurations are contemplated.

Advertising content has typically been created by an advertiser or a third party with whom the advertiser has contracted, and includes video, audio, and/or still images that seek to promote sales or consumer awareness of a particular product or service. Advertising content is typically delivered to consumers via one or more intermediary parties. Here, advertising content is delivered to consumers via the HRTV channel 12. The HRTV channel 12 includes advertising inventory with available slots or time slots for providing advertising content. The slots may be purchased. Purchasing slots will be discussed in greater detail below.

During an ad insertion point (i.e., a programmatic commercial insertion point), ad determinations as associated with video content may be made by the system 10.

In the example shown in FIG. 2, the method starts at step 102 for determining whether video content from the radio system 16 is present or available.

The encoder 28 is configured to encode or transcode each content block(s) based on a determined encoding parameter to generate an encoded media file in a target format. As mentioned above, the audio content and video content are non-synchronized.

Here, video content from the radio system 16 takes priority over video content from other sources. If there is video content from the radio system 16, the method moves to step 104 with the video content from the radio system 16 being inserted into the HRTV channel 12 to be displayed, streamed, and the like on the HRTV channel 12.

If there is no video content from the radio system 16 available, the method moves to step 106 to determine whether there is video content from the ad server 30. Video content may be advertisement content with video from the radio system 16 or advertisement content with video from the television system 14 and/or a third-party television network. For instance, the ad server may receive television advertisement content 36 from the television system 14, a third-party television network, and/or the like. Other configurations are contemplated.

If there is no video content from the radio system 16 but there is video content from the ad server available, the method continues (illustrated as part of step 104 in FIG. 2) with the video content from the ad server 30 being inserted into the HRTV channel 12 to be displayed, streamed, and the like on the HRTV channel 12.

The ad server 30 may be configured to operate in a variety of different manners, including as a pre-auction bid submission, real-time bid submission, and/or hybrid bid submission to viewers in an ad auction. The ad server 30 may respond the bid submission in a real-time or semi-real-time manner. The ad server 30 will fill unsold inventory with audio advertisement (see FIG. 1) from the radio system 16 with video content from the television system 14.

Communication between the advertisers and the system 10 may be managed by several entities, including a demand-side provider (DSP), an advertising exchange, and a supply-side provider (SSP). An advertising exchange is an environment in which advertisers can bid on available slots. In some configurations, the advertising exchange interfaces between the SSP and the DSP. The interfacing role includes receiving inventory or advertisement content from one or more SSPs and making it available to the DSP, then receiving bids on the content from the DSP and providing those bids to the SSP. Thus, a DSP makes it possible for an advertiser to bid on content provided by a particular SSP. Other configurations are contemplated.

It is understood that an "avail" or "available slot" is a time space provided to television or radio operators or video service providers by national broadcasters during a program for use by the former for placement of ads. Generally, this time is used for showing local/regional advertisements. Hence, typically, the "avail" time or "available slot" is usually sold to local advertisers by such service providers or used for self-promotion. Providing advertisement opportunities to one or more entities allows the ad server 30 to maximize the reach of an advertisement opportunity to other bidders. With the ad server 30 being con ad to accept real-time bids from programmatic audio marketplaces, there is an increase in the inventory fill rate which ultimately increases revenue.

In some configurations, the ad server 30 may be configured to provide advertisement data using a Digital Video Ad Serving Template (VAST) format. VAST is a specification by the Interactive Advertising Bureau (IAB) that provides a common advertisement response format for video players that enables video advertisements to be served across compliant players. In this configuration, the ad server 30 integrates VAST tags for real-time-bidding (RTB) from multiple marketplaces such that the audio-visual advertisements with the highest bid will win and be inserted into the HRTV channel 12. Other configurations to provide advertisement data is contemplated.

Referring back to FIG. 2, if there is no video content from the ad server 30 as determined in step 106 and no video content from the radio system 16 as determined in step 104, the method moves to step 108 to determine whether there is a pre-loaded logo available from the radio system 16. As mentioned above, the ad server 30 and the radio system 16 are in communication. The radio system 16 may be configured to provide the ad server 30 with data associated with a particular radio station. Data may include a logo or the like associated with the radio station. If there is a pre-loaded logo from the radio system 16 (and there is no video content from the ad server 30 as determined in step 106 and no video content from the radio system 16 as determined in step 104), the method continues with the pre-loaded logo from the radio system 16 being inserted into the HRTV channel 12 to be displayed (also shown in conjunction with step 104 as illustrated in FIG. 2).

If there is no pre-loaded logo from the radio system 16 (and there is no video content from the ad server 30 as determined in step 106 and no video content from the radio system 16 as determined in step 104), the method moves to step 110. In step 110, video content from the television system 14 and/or from the original HRTV channel 12 will be displayed. Generally, when a video advertisement is inserted into the HRTV channel 12, both video and audio content from the broadcast automation system 34 will be replaced with the video-audio commercial. When an audio advertisement is inserted into the HRTV channel 12, only the audio content will be replaced with the audio advertisement, and the video content from the original HRTV channel 12 will continue to stream. In another case, and radio audio ad will play on the HRTV channel while a static graphic image referring to the audio ad will be displayed visually thereby adding to the effectiveness of the audio ad.

Several configurations have been discussed in the foregoing description. However, the configurations discussed herein are not intended to be exhaustive or limit the disclosure to any particular form. The terminology which has been used is intended to be in the nature of words of description rather than of limitation. Many modifications and variations are possible in light of the above teachings and the disclosure may be practiced otherwise than as specifically described.

What is claimed is:

1. A method for providing programmatic commercial insertion for a hybrid radio-TV channel of a system, the system including a television system, a radio system and an ad server, said method comprising:

providing integrated or combined radio content from the radio system for broadcasting on the hybrid radio-TV channel, the integrated or combined radio content including content blocks and an ad insertion point defined between the content blocks;

providing television content from the television system for display on the hybrid radio-TV channel during the content blocks;

determining whether a video content is available from the radio system during the ad insertion point;

determining whether a video content is available from the ad server during the ad insertion point;

determining whether a pre-loaded logo is available from the radio system during the ad insertion point; and inserting the video content from the radio system into the hybrid radio-TV channel during the ad insertion point for display on the hybrid radio-TV channel; or inserting the video content from the ad server into the hybrid radio-TV channel during the ad insertion point for display on the hybrid radio-TV channel when the video content from the radio system is not available during the ad insertion point; or inserting the pre-loaded logo from the radio system into the hybrid radio-TV channel during the ad insertion point for display on the hybrid radio-TV channel when the video content from the radio system and the video content from the ad server is not available during the ad insertion point; or displaying the video content from the television system and/or from the hybrid radio-TV channel during the ad insertion point for the display on the hybrid radio-TV channel when the video content from the radio system is unavailable and when the video content from the ad server is unavailable and when the pre-loaded logo from the radio system is unavailable during the ad insertion point.

2. The method of claim 1, wherein the integrated or combined radio content from the radio system is not synchronized with the television content from the television system.

3. The method of claim 1, wherein the integrated or combined radio content from the radio system is selected from advertising, program, program services, product content, and combinations thereof.

4. The method of claim 1, wherein the radio system includes a radio automation system, and wherein said method further comprises creating the content blocks using the radio automation system.

5. The method of claim 4, further comprising creating commercial breaks in the content block using the radio automation system.

6. The method of claim 5, wherein said step of creating commercial breaks comprises creating commercial breaks with a cue tone, relay contact closures, or other signals indicating a start and length of the created commercial break.

7. The method of claim 4, further comprising creating metadata using said radio automation system to separate the integrated or combined radio content into distinct content blocks.

8. The method of claim 7, wherein the distinct content blocks comprises a radio advertisement block or a radio entertainment block.

9. The method of claim 1, wherein the system further includes an encoder, and wherein said method further comprises encoding or transcoding each of the content blocks based on an encoding parameter to generate an encoded media file in a target file.

10. The method of claim 1, wherein the system further includes an encoder, and wherein said method further comprises:
   using said encoder to receive an audio feed from the radio system and encode the received audio feed; and
   using said encoder to separately receive a video feed and encode the received video feed from the television system.

11. The method of claim 10 further comprising using the encoder to continuously inspect the received audio feed to find a commercial break in time and a commercial break out time.

12. The method of claim 11 further comprising using the encoder to continuously inspect the received video feed to find a commercial break in time and a commercial break out time.

13. The method of claim 10 further comprising using the encoder to continuously inspect the received video feed to find a commercial break in time and a commercial break out time.

14. A system for providing programmatic commercial insertion to a hybrid radio-TV channel comprising:
   the hybrid radio-TV channel,
   a television system;
   a radio system;
   an ad server and configured for creating content blocks and creating an ad insertion point;
   said system configured to:
      provide integrated or combined radio content from the radio system for broadcasting on the hybrid radio-TV channel, the integrated or combined radio content including content blocks and an ad insertion point defined between the content blocks;
      provide television content from the television system for display on the hybrid radio-TV channel during the content blocks;
      determine whether a video content is available from the radio system during the ad insertion point;
      determine whether a video content is available from the ad server during the ad insertion point;
      determine whether a pre-loaded logo is available from the radio system during the ad insertion point; and
      insert the video content from the radio system into the hybrid radio-TV channel during the ad insertion point for display on the hybrid radio-TV channel; or
      insert the video content from the ad server into the hybrid radio-TV channel during the ad insertion point for display on the hybrid radio-TV channel when the video content from the radio system is not available during the ad insertion point; or
      insert the pre-loaded logo from the radio system into the hybrid radio-TV channel during the ad insertion point for display on the hybrid radio-TV channel when the video content from the radio system and the video content from the ad server is not available during the ad insertion point; or
      display the video content from the television system and/or from the hybrid radio-TV channel on the hybrid radio-TV channel during the ad insertion point when the video content from the radio system is unavailable and when the video content from the ad server is unavailable and when the pre-loaded logo from the radio system is unavailable during the ad insertion point.

15. The system of claim 14, wherein the integrated or combined radio content from the radio system is not synchronized with the television content from the television system.

16. The system of claim 14, wherein the integrated or combined radio content from the radio system is selected from advertising, program, program services, product content, and combinations thereof.

17. The system of claim 14, wherein the radio system includes a radio automation system configured for creating the content blocks.

18. The system of claim 17, wherein the radio automation system is further configured to create commercial breaks in the content blocks.

19. The system of claim 14 further comprising an encoder for encoding or transcoding each of the content blocks based on an encoding parameter to generate an encoded media file in a target file.

20. The system of claim 14 further comprising an encoder:
   wherein the encoder is configured to receive and encode an audio feed from the radio system; and
   wherein the encoder is used to separately receive and encode a video feed from the television system.

* * * * *